United States Patent
Mao

(10) Patent No.: US 8,503,669 B2
(45) Date of Patent: Aug. 6, 2013

(54) INTEGRATED LATENCY DETECTION AND ECHO CANCELLATION

(75) Inventor: Xiadong Mao, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1138 days.

(21) Appl. No.: 12/099,030

(22) Filed: Apr. 7, 2008

(65) Prior Publication Data

US 2009/0252343 A1 Oct. 8, 2009

(51) Int. Cl.
H04M 9/08 (2006.01)
H04B 3/20 (2006.01)
H04B 15/00 (2006.01)

(52) U.S. Cl.
USPC .............. 379/406.06; 370/286; 381/94.1

(58) Field of Classification Search
USPC . 381/66, 93, 94.1, 94.3; 379/406.01–406.16; 370/289, 282–286
See application file for complete search history.

(56) References Cited

U.S. PATENT DOCUMENTS

| 6,995,311 | B2 * | 2/2006 | Stevenson .................... 84/737 |
| 6,996,240 | B1 | 2/2006 | Sasaki |
| 7,046,795 | B2 * | 5/2006 | Graumann et al. ...... 379/406.06 |
| 7,120,259 | B1 | 10/2006 | Ballanty et al. |
| 7,177,416 | B1 | 2/2007 | Zhang et al. |
| 2004/0059571 | A1 | 3/2004 | Ohtomo |
| 2005/0216542 | A1 * | 9/2005 | Liao ............................ 708/322 |
| 2006/0093128 | A1 * | 5/2006 | Oxford ................... 379/406.01 |
| 2006/0233389 | A1 | 10/2006 | Mao et al. ........................ 381/92 |
| 2006/0239471 | A1 | 10/2006 | Mao et al. ........................ 381/92 |
| 2007/0025562 | A1 | 2/2007 | Zalewski et al. ................ 381/92 |
| 2007/0033030 | A1 | 2/2007 | Gottesman |
| 2007/0055505 | A1 * | 3/2007 | Doclo et al. .................. 704/226 |
| 2007/0260340 | A1 | 11/2007 | Mao ............................... 700/94 |
| 2007/0274535 | A1 | 11/2007 | Mao ............................. 381/94.1 |
| 2008/0181422 | A1 * | 7/2008 | Christoph ................... 381/73.1 |

OTHER PUBLICATIONS prewhitening, LabVIEW 2009 system Identification Toolkit, National Instrument.*
International Search Report dated Nov. 4, 2009 for International Patent Application No. PCT/US09/37321.

* cited by examiner

*Primary Examiner* — Matthew Landau
*Assistant Examiner* — Khaja Ahmad
(74) *Attorney, Agent, or Firm* — Joshua D. Isenberg; JDI Patent

(57) ABSTRACT

In an audio system having a microphone, a speaker coupled to a source of audio output, and an echo canceller coupled to the speaker and microphone, latency between the source of audio output and the speaker may be compensated in echo cancellation performed by the echo canceller. The echo canceller may use a reference signal derived from a signal from the source of audio output in echo cancellation. The latency may be compensated by measuring the latency between the signal from the source of audio output and the speaker, determining a delay amount from the latency, delaying the reference signal by the delay amount to produce a delayed reference signal, and using the delayed reference signal as the reference signal in the echo canceller.

12 Claims, 3 Drawing Sheets

INTEGRATED LATENCY DETECTION AND ECHO CANCELLATION

FIELD OF THE INVENTION

Embodiments of this invention are related to audio signal processing and more particularly to echo cancellation in audio signal processing.

BACKGROUND OF THE INVENTION

Many portable electronics devices, such as interactive video game controllers are capable of handling two-way audio signals. Such a device typically includes a microphone that receives a local speech signal s(t) from a user of the device and a speaker that emits a speaker signal x(t) that is audible to the user. To make the video game controller more compact it is often desirable to place the microphone and speaker relatively close to each other, e.g., within about 10 centimeters of each other. The user, by contrast may be much further from the microphone, e.g., about 3 to 5 meters away. The microphone produces a signal d(t) that includes both the local speech signal s(t) and a speaker echo signal $x_1(t)$. In addition, the microphone may pick up background noise n(t) so that the overall microphone signal $d(t)=s(t)+x_1(t)+n(t)$. Due to the relative proximity of the speaker, the microphone signal d(t) may be dominated by the speaker echo signal $x_1(t)$.

Speaker echo is a commonly observed phenomenon in telecommunications applications and echo suppression and echo cancellation are relatively mature technologies. Echo suppressors work by detecting if there is a voice signal going in one direction on a circuit, and then inserting a great deal of loss in the other direction. Usually the echo suppressor at the far-end of the circuit adds this loss when it detects voice coming from the near-end of the circuit. This added loss prevents the speaker signal x(t) from being retransmitted in the local speech signal d(t). Echo cancellation may implemented as part of a software based on a room impulse model that includes the effects of the acoustics of the room in which the microphone and speaker are located. Such echo cancellation often uses the speaker signal x(t) as a reference.

The Acoustic Echo Cancellation (AEC) process works as follows. The received speaker signal x(t) is digitally sampled to form a reference signal r(t). The reference signal r(t) is then used to produce sound with the speaker. The microphone picks up the resulting direct path sound, and consequent reverberant sound which is converted to the microphone signal d(t). The microphone signal d(t) is digitally sampled and filtered to extract the echo signal $x_1(t)$. The reference signal and echo signal are compared. The reference signal is summed with the echo signal at 180° out of phase. Again, in an ideal system this results in a perfect cancellation. This process continues for every sample.

There are two main issues that echo cancellers must deal with. The first is the changes and additions to the original signal caused by imperfections of the loudspeaker, microphone, reverberant space and physical coupling. The second is the changing nature of those changes. See below. The first problem is dealt with by the room model, which models the acoustic space in the time and frequency domains. AEC (Acoustic Echo Cancellation) algorithms approximate the result of the next sample by comparing the difference between the current and previous samples. Specifically, a sound may be sampled pre-speaker and post microphone, then compared for initial differences in frequencies, and frequencies that are longer than they were in the original sample. This may be visualized by a Fourier Transform. The resulting information may then be used to predict how the next sound will be altered by the acoustic path. The model of the acoustic space (sometimes referred to as the room model) is therefore continually updated.

The changing nature of the sampled signal is mainly due to changes in the acoustic environment, not the characteristics of loudspeaker, microphone or physical coupling. These are from moving objects in the environment, and movement of the microphone within that environment. For this reason, the cancellation algorithm also has a degree of aggressive adaptation called Non-Linear Processing. This allows the algorithm to make changes to the model of the acoustic path that are suggested, but not yet confirmed by comparison of the two signals.

Echo cancellation algorithms can tolerate a certain amount of latency between the speaker signal x(t) and the microphone signal d(t). However, this latency may sometimes be larger than anticipated.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

Figure 1:
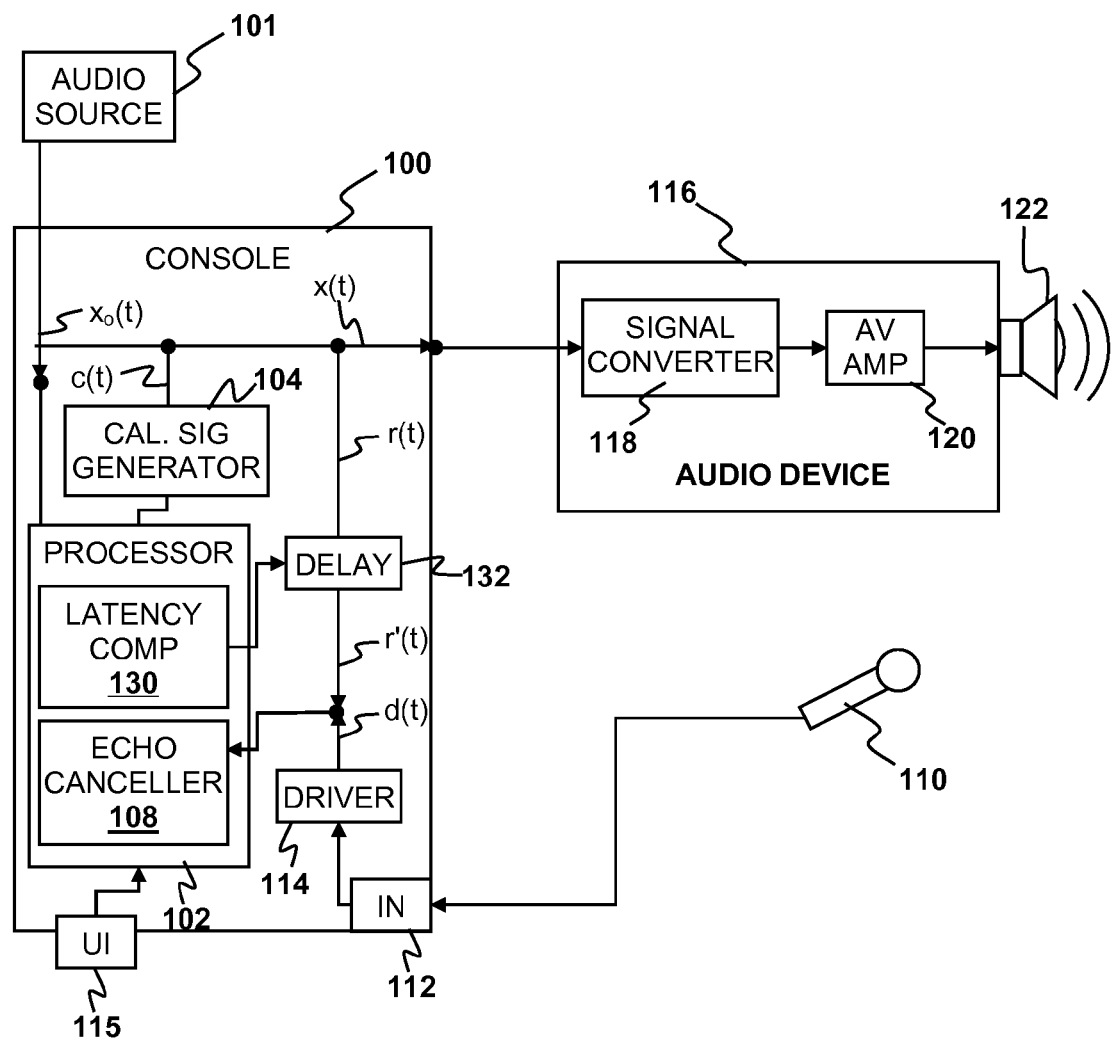
FIG. 1 is a schematic diagram illustrating an audio system according to an embodiment of the present invention.

FIG. 1 illustrates both the problem and the solution to hardware latency associated with echo cancellation. As seen in FIG. 1 an audio signal processing console 100 may include a processor 102, calibration signal generator 104. The processor 102 may be programmed with suitable software 108, which may implement echo cancellation, e.g., as described above. Specifically, the software may sample a reference signal r(t) derived from a speaker signal $x_o(t)$, which may be remotely generated, e.g., by an audio source 101. Alternatively, the speaker signal $x_o(t)$ may be generated internally within the console device 100, e.g., in response to software, e.g., video game software, executed by the processor 102. The echo cancellation software 108 may also sample a microphone signal from a microphone 110. By way of example, the microphone signal may be coupled to the console 100 through an interface 112 such as a Universal Serial Bus (USB) interface. Alternatively, the interface 112 may be a wireless interface, such as a Bluetooth interface. The interface 112 may be coupled to a driver 114 that generates a microphone signal d(t) that is coupled to the processor 102. The driver 114 may be implemented in hardware or software or some combination of hardware and software.

The sound signal $x_o(t)$ is coupled from an audio output 115 on the console to an external audio device 116. By way of example the audio device may be a stereo system or television set. The audio device 116 generally includes a signal converter 118 coupled to an amplifier 120 and a speaker 122 coupled to the amplifier. By way of example, and without limitation, the signal converter 118 may be of any conventional type, e.g., High Definition Multimedia interface (HDMI), Sony/Philips Digital Interconnect Format (S/PDIF) or digital to analog interface. HDMI is a licensable compact audio/video connector interface for transmitting uncompressed digital streams. HDMI connects DRM-enforcing digital audio/video sources such as a set-top box, an HD DVD disc player, a Blu-ray Disc player, a personal computer, a video game console, or an AV receiver to a compatible digital audio device and/or video monitor such as a digital television (DTV). S/PDIF specifies a Data Link Layer protocol and choice of Physical Layer specifications for carrying digital audio signals between devices and stereo components. The audio output 115 on the console 102 may include a suitable releasable connector to facilitate coupling to the interface 118 so that the speaker may be removeably coupled to the console 100.

It is noted that the console 100 and the audio device 116 may be made by different manufacturers. Certain console devices, such as video game system consoles, must often be compatible with many different types of audio devices having signal processing parameters that are unknown a priori. One important parameter is the signal latency introduced by the interface 118, the amplifier 120 and even the speaker 122. As used herein this signal latency refers to a time delay between arrival of the signal at the audio output 115 and generation of sound by the speaker 122. As noted above, the echo cancellation algorithm implemented by the software 108 can typically accommodate a finite latency. Conventional echo cancellation algorithms, such as those based on a room model, typically take latency into account, but use the latency for a different purpose. Conventional echo-cancelers are mostly based on finite impulse response (FIR). The provided latency can be used to simulate the FIR delay tabs. In general, a good FIR in echo-canceler needs some small latency to meet FIR causality. There are a number of different possible echo cancellation schemes that may be used in conjunction with embodiments of the present invention. One possible scheme has been described above. In another possible echo cancellation scheme, an integrated echo and noise-canceler may have two functionally identical filters with orthogonal controls and representations. In such a configuration the two orthogonal filters complement each other in a way that can boost the overall system robustness in a noisy hands free voice communication. Such an echo and noise cancellation scheme is described in detail in commonly assigned US Patent Application Publication 20070274535, the entire contents of which are incorporated herein by reference. In particular, the echo canceler 108 may be an integrated echo-noise-canceler uses two separately controlled sub-systems in parallel, each with orthogonal control mechanism. The echo-noise-canceler includes a front echo canceler and a backup echo canceler. The front echo-canceler uses double-talk detection and takes conservative adaptation approaches to ensure it is robust against local voice, yet provide less echo-suppression and slow adaptation speech to echo-change. The backup echo-canceler uses cross-correlation to measure the similarity between the error signal and echo signal, it takes an aggressive strategy to ensure the filter is quickly updated and provides large echo-suppression, yet it is unstable to local voice/noise, due to possible over adaptation. An integration of these two echo-canceler outputs is based on cross-correlation analysis that measures which echo canceler has a larger differentiation against the echo signal. The integration also checks the filter stability of both echo cancelers. If one filter is overestimated or underestimated it is then complemented by the other filter. Such a system is designed to ensure there is at one filter working correctly at any given time.

An integrated echo-noise canceler may optionally include an echo-residual-noise-estimator that takes a similar approach using two independent sub estimators in parallel, each with orthogonal controlling. A first estimator is based on echo-distance-mismatch that depends on a robust double-talk-detector. The first estimator is relatively accurate yet not stable due to double-talk-detection errors. A second estimator is based on cross-spectrum-analysis. Its estimation is biased but stable and consistent without depending on local voice detection. The integration of these two estimations of the residual echo takes a minimum/maximum approach for far-end-talk only and double-talk respectively.

The audio device 116 may have an (unknown) latency that is significantly larger than that which the echo cancellation algorithm in the software 108 can tolerate. By way of example, the echo cancellation algorithm in the software 108 may tolerate a latency of around 160 milliseconds. If the latency introduced by the interface 118, amplifier 120, and speaker 122 is greater than that which can be accommodated by the echo cancellation in the software, the echo canceler will not work. This is particularly a problem for A/V chat. It is theoretically possible to adjust the latency tolerance of the echo cancellation algorithm implemented by the software 108. However, it is difficult for a conventional echo cancellation algorithm to adjust the amount of latency that is tolerable without resorting to massive computation.

The solution to this problem is to detect the signal latency introduced between the audio output 115 on the console 100 and the speaker 122 and remove the impact of that latency by applying an appropriate delay to the reference signal r(t) that is used by the echo cancellation algorithm in the software 108. This solution allows a conventional echo canceler to be used in conjunction with any audio device for which the latency can be measured. It is noted that the echo cancellation algorithm in the software 108 need not be changed. To this end the console 100 may include a latency compensator 130. By way of example, and without loss of generality, the latency compensator 130 may be implemented in software running on the processor 102. Alternatively, the latency compensator 130 may be implemented in hardware or in some combination of hardware and software. Operation of the latency compensator may be understood with respect to the flow diagram of FIG. 2A, which illustrates a latency compensation method 200, which may be used in an audio system having a microphone, a speaker coupled to a source of audio output, and an echo canceler coupled to the speaker and microphone. The method compensates for latency between the source of audio output and the speaker in echo cancellation performed by the echo canceler, which uses a reference signal derived from a signal from the source of audio output in echo cancellation.

As indicated at 202 a latency between the signal from the source of audio output and the speaker is measured. There are a number of different ways of measuring latency. One possible way, among others is the latency measurement method 210 shown in FIG. 2B. Specifically, a calibration signal may be generated at 212. The calibration signal generator 104 on the console 100 may be used for this purpose. The calibration signal generator 104 may be implemented in software or hardware or some combination of software and hardware. In a preferred embodiment, the calibration signal is a white noise signal. As used herein, the expression "white noise" refers to a random signal characterized by a flat power spectral density. In other words, the signal's power spectral density has equal power in any band, at any centre frequency, having a given bandwidth.

Because white noise is broadband, latency may be detected for every frequency in broad-band calibration signal spectrum. Narrow-band noise signals (sometimes called pink noise or sinusoid noise), by contrast are only useful for detecting latency at some particular frequencies. As noted above, the latency of the audio device 116 at any frequency is generally a priori unknown. It is desirable to ensure that this latency is properly taken into account. For example, some AV amplifiers may introduce large latency at low frequencies for a low frequency effects (LFE) channel, but not at higher frequencies. The low frequency latency might not be detected if the signal from calibration signal generator does not include a sufficient low-frequency component. By using a broad-band spectrum calibration signal, the system can detect latency for any possible AV device 116.

As indicated at 214, the calibration signal c(t) may be applied to the speaker 122. By way of example the calibration signal c(t) may be applied to the signal converter 118, which is coupled between the source of audio output and the speaker 122. Sound is generated from the calibration signal c(t) the speaker 122 as indicated at 216. The signal converter 118, amplifier 120 and speaker 122 may be thought of as a "black box" into which the audio output signal x(t) is applied and from which sound emerges. The sound is captured with the microphone 110 and converted to a microphone signal d(t) as indicated at 218. The calibration signal c(t) is then compared to the microphone signal at 220 to determine the signal latency L due to the signal converter 118, amplifier 120 and speaker 122.

The latency may be determined from the microphone signal and the audio output signal by performing a cross-correlation analysis between the original signal and recorded signal, and determining the maximum correlation point. This process, sometimes known as "time-delay-arrival (TDA) analysis", is widely used in radar, sonar and microphone array applications.

Referring again to FIG. 2A, a delay amount Δ may be determined from the latency L as indicated at 204. The delay amount may be determined by comparing the measured latency L to a latency tolerance $L_{tol}$ of the echo canceler 108. By way of example, if the measured latency L is within the tolerance of the echo canceler 108 then the delay amount Δ may be zero or some small amount that is less than the latency tolerance $L_{tol}$. If the measured latency L is greater than the latency tolerance $L_{tol}$, the delay amount Δ may be between L-$L_{tol}$ and L.

The delay amount Δ may be determined experimentally from the measured latency L. AV equipment latency usually tends to follow a standard. For example, most HDMI AV equipment has 150 msec latency. AV equipment with a significant amount of optical connection introduces about 32 to 64 msec latency. One may take a conservative approach to setting the delay amount Δ. For example, if the detected latency is 250 msec, the delay amount Δ may be 150 msec. In some embodiments, the console 100 may include a user interface 115 coupled to the processor 102 (and therefore to the latency compensator 130). The latency compensator 130 may be configured (e.g., through suitable programming of the processor 102) to adjust the delay amount in response to a signal from the user input 115. Thus, a user may fine tune the delay amount Δ in response to the perceived amount of echo. For example, if 150 microsecond delay amount Δ does not work well, a user may increase the delay amount Δ to 200 msec. It is noted that a precise estimation of the latency and the delay amount are not required as long as the echo-canceler 108 works sufficiently well.

The reference signal may then be delayed by the delay amount to produce a delayed reference signal r'(t) as indicated at 206. By way of example, the console may include a delay generator 132 for this purpose. The delay generator 132 may be implemented in hardware or in software or some combination of hardware and software. As indicated at 208, the delayed reference signal r'(t) may then be used as the reference signal in the echo canceler 108. By way of example, the echo canceler 108 may compare the delayed reference signal r'(t) with the microphone signal d(t), extract an echo signal $x_1(t)$ from the microphone signal d(t) and subtract the echo signal $x_1(t)$ from the microphone signal d(t).

Figure 2A:
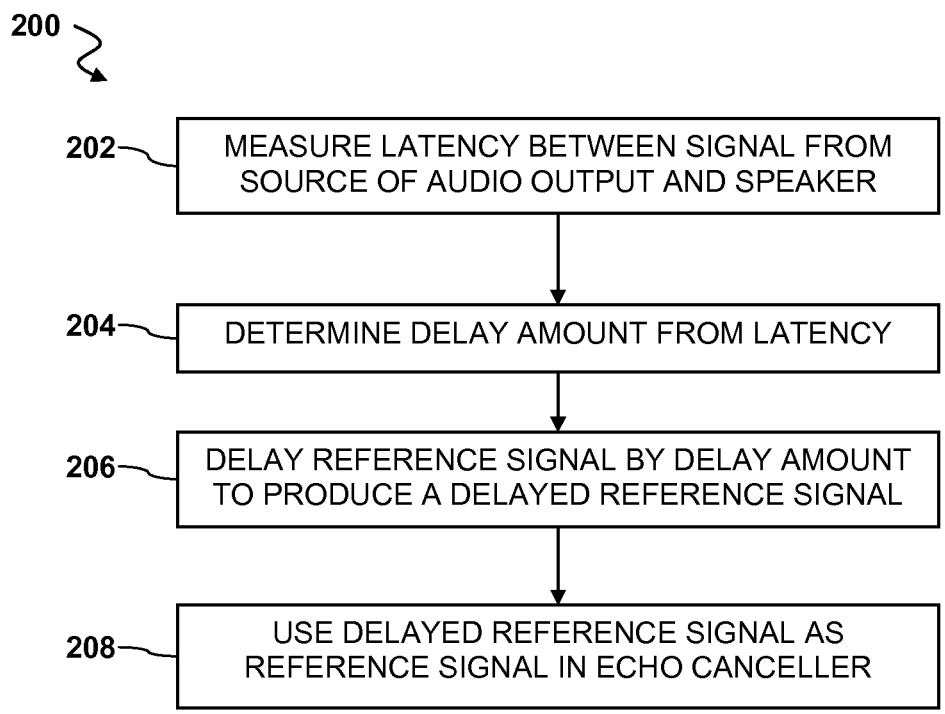
FIG. 2A is a flow diagram illustrating a method for compensating for latency according to an embodiment of the present invention.
Figure 2B:
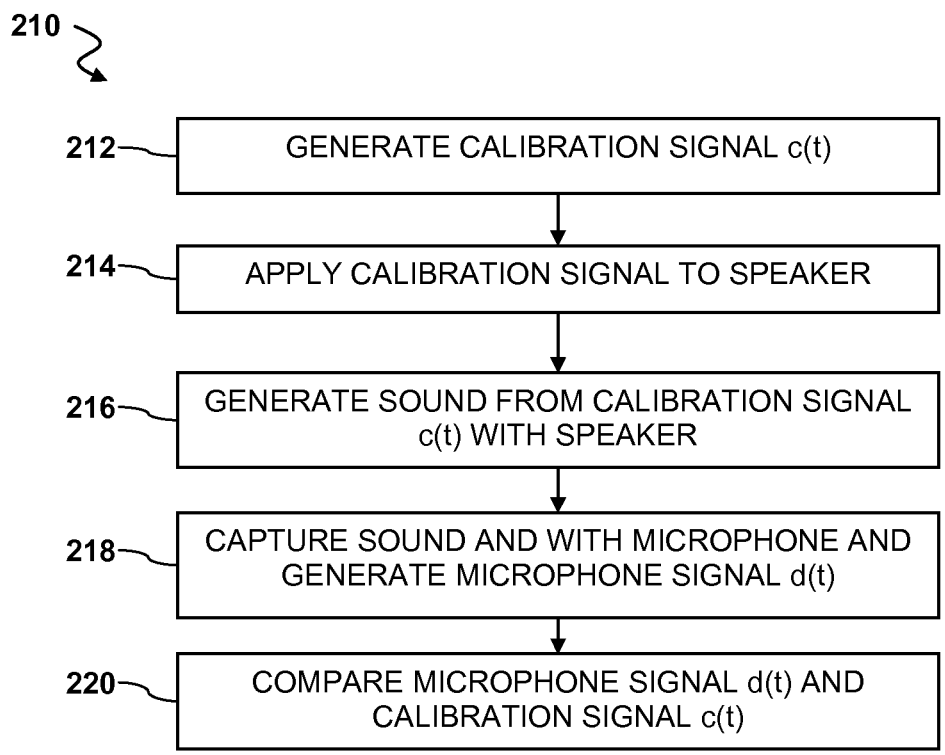
FIG. 2B is a flow diagram illustrating a method for measuring latency according to an embodiment of the present invention.
Figure 3:
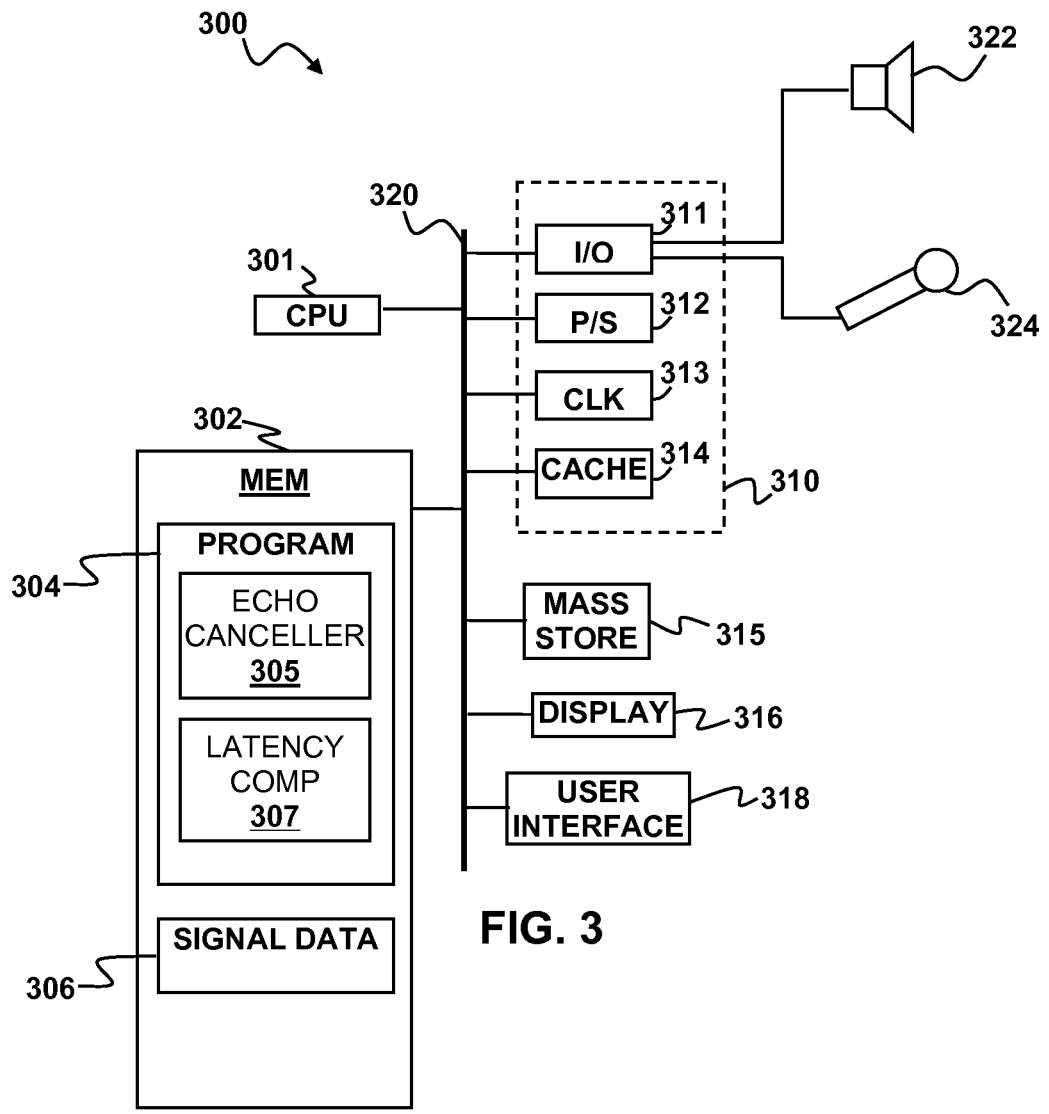
FIG. 3 is a schematic diagram of an audio system according to an alternative embodiment of the present invention.

According to embodiments of the present invention, a signal processing method of the type described above with respect to FIG. 1, and FIG. 2 operating as described above may be implemented as part of a signal processing apparatus 300, as depicted in FIG. 3. The system 300 may include a processor 301 and a memory 302 (e.g., RAM, DRAM, ROM, and the like). In addition, the signal processing apparatus 300 may have multiple processors 301 if parallel processing is to be implemented. The memory 302 includes data and code configured as described above. Specifically, the memory 302 may program code 304 and signal data 306. The code 304 may implement the echo canceler 108, latency compensator 130, calibration signal generator 132 described above. The signal data 306 may include digital representations of the microphone signal d(t) and/or the speaker signal x(t).

The apparatus 300 may also include well-known support functions 310, such as input/output (I/O) elements 311, power supplies (P/S) 312, a clock (CLK) 313 and cache 314. The apparatus 300 may optionally include a mass storage device 315 such as a disk drive, CD-ROM drive, tape drive, or the like to store programs and/or data. The controller may also optionally include a display unit 316 and user interface unit 318 to facilitate interaction between the controller 300 and a user. The display unit 316 may be in the form of a cathode ray tube (CRT) or flat panel screen that displays text, numerals, graphical symbols or images. The user interface 318 may include a keyboard, mouse, joystick, light pen or other device. In addition, a speaker 322 and a microphone 324 may be coupled to the processor 302 via the I/O elements 311. The processor 301, memory 302 and other components of the system 300 may exchange signals (e.g., code instructions and data) with each other via a system bus 320 as shown in FIG. 3.

As used herein, the term I/O generally refers to any program, operation or device that transfers data to or from the system 300 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

The processor 301 may perform digital signal processing on signal data 306 as described above in response to the data 306 and program code instructions of a program 304 stored and retrieved by the memory 302 and executed by the processor module 301. Code portions of the program 304 may conform to any one of a number of different programming languages such as Assembly, C++, JAVA or a number of other languages. The processor module 301 forms a general-purpose computer that becomes a specific purpose computer when executing programs such as the program code 304. Although the program code 304 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 304 may include a set of processor readable instructions that implement a method having features in common with the method 200 of FIG. 2A or the method 210 of FIG. 2B. The program code 304 may generally include echo canceler instructions 305 that, when executed by the processor 301, use a reference signal derived from a signal from a source of audio output in echo cancellation of a signal from the microphone 324. The program code 304 may also include latency compensation instructions 307 that, when executed by the processor 301, measure a latency between the signal from the source of audio output and the speaker 322, determine a delay amount from the latency and delay the reference signal by the delay amount, whereby the echo canceler uses the delayed reference signal as the reference signal for echo cancellation of the signal from the microphone. Specifically, the user interface unit 318 may be used in conjunction with the program code 304 to allow a user to manually adjust the delay amount in order to optimize the performance of the echo canceler.

Embodiments of the present invention allow for more robust yet accurate echo cancellation without the burden of massive computation for latency compensation within the echo canceler. Consequently, the echo compensation algorithm need not be modified since the delay is applied to the input reference signal used by the echo canceler. Embodiments of the invention provide a simple yet robust solution to the problem of signal latency due to the unknown signal latency of external audio devices coupled to a console that implements applications that require echo cancellation. Embodiments of the present invention therefore allow for robust echo cancellation in applications such as audio visual chat in online video games.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for.

What is claimed is:

1. In an audio system having a microphone, a speaker coupled to a source of audio output, and an echo canceller coupled to the speaker and microphone, a method for compensating for latency between the source of audio output and the speaker in echo cancellation performed by the echo canceller, wherein the echo canceller uses a reference signal derived from a signal from the source of audio output in echo cancellation, the method comprising:

a) measuring a frequency dependent latency between the signal from the source of audio output and the speaker, wherein measuring the frequency dependent latency includes applying a broadband white noise calibration signal to the speaker, wherein the frequency dependent latency is caused by one or more components of the audio system that are characterized by a component latency that depends on the frequency of the signal, generating sound from the broadband white noise calibration signal with the speaker, capturing the sound with the microphone and converting the sound to a microphone signal, and comparing the broadband white noise calibration signal to the microphone signal;
   b) determining a frequency dependent delay amount from the frequency dependent latency;
   c) delaying the reference signal by the frequency dependent delay amount to produce a delayed reference signal; and
   d) using the delayed reference signal as the reference signal in the echo canceller.

2. The method of claim 1, wherein applying the calibration signal to the speaker and generating sound from the calibration signal with the speaker include applying the calibration signal to a signal converter coupled between the source of audio output and the speaker.

3. The method of claim 1 wherein the delay amount is determined by comparing the latency determined in b) to a latency tolerance of the echo canceller.

4. The method of claim 1 wherein d) includes comparing the delayed reference signal with the microphone signal, extracting an echo signal from the microphone signal and subtracting the echo signal from the microphone signal.

5. An audio system operable with a source of audio output, a speaker and a microphone, comprising:

a microphone interface configured to receive a signal from the microphone;
   a speaker output configured to be coupled to the source of audio output;
   an echo canceller coupled to the speaker output and the microphone interface, wherein the echo canceller is configured to use a reference signal derived from a signal from the source of audio output in echo cancellation,
   a latency compensator configured to measure a frequency dependent latency between the signal from the source of audio output and the speaker, wherein the frequency dependent latency is caused by one or more components of the audio system that are characterized by a component latency that depends on the frequency of the signal, determine a frequency dependent delay amount from the frequency dependent latency and
   delay the reference signal by the frequency dependent delay amount, whereby the echo canceller uses the delayed reference signal as the reference signal for echo cancellation of a signal from the microphone; and
   a calibration signal generator coupled to the latency compensator and the speaker output wherein the calibration signal generator is configured to generate a broadband white noise calibration signal, and apply the broadband white noise calibration signal to the speaker output.

6. The audio system of claim 5 wherein the speaker output is configured to receive a removable connection to the speaker.

7. The audio system of claim 6 wherein the removable connection is connection for a HDMI or S/PDIF interface.

8. The audio system of claim 5, further comprising a user interface coupled to the latency compensator.

9. The audio system of claim 8 wherein the latency compensator is configured to adjust the delay amount in response to a signal from the user input.

10. An audio system comprising:
a speaker output configured to be coupled to a source of audio output;
a computer processor coupled to the speaker output and an interface configured to receive a signal from a microphone and
computer readable instructions executable by the processor, wherein the computer readable instructions include echo canceller instructions that, when executed by the processor, use a reference signal derived from a signal from the source of audio output in echo cancellation of the signal from the microphone; and
latency compensation instructions that, when executed by the processor, generate a broadband white noise calibration signal, apply the white noise calibration signal to a signal converter coupled between the source of audio output and the speaker, wherein one or more components of the audio system are characterized by a component latency that depends on the frequency of the signal, capture the signal from the microphone and compare the broadband white noise calibration signal applied to the signal converter to the signal from the microphone, wherein the signal from the microphone contains sound generated from the broadband white noise calibration signal with the signal converter and the speaker, measure a latency between the signal from the source of audio output and the speaker, wherein the frequency dependent latency is caused by the component latency of the one or more components of the audio system, determine a frequency dependent delay amount from the frequency dependent latency and delay the reference signal by the frequency dependent delay amount, whereby the echo canceller uses the delayed reference signal as the reference signal for echo cancellation of the signal from the microphone.

11. The audio system of claim 10, further comprising a user interface coupled to the processor.

12. The audio system of claim 11 wherein the compensation instructions are configured to adjust the delay amount in response to a signal from the user interface.

* * * * *